(12) United States Patent
Kervadec et al.

(10) Patent No.: US 10,277,925 B2
(45) Date of Patent: Apr. 30, 2019

(54) GENERATION OF A VIDEO MOSAIC (71) Applicant: ORANGE, Paris, FL (US)

(72) Inventors: Sylvain Kervadec, Sens de Bretagne (FR); Stephane Davenet, Melesse (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 15/537,960

(22) PCT Filed: Dec. 21, 2015

(86) PCT No.: PCT/FR2015/053694
§ 371 (c)(1),
(2) Date: Jun. 20, 2017

(87) PCT Pub. No.: WO2016/102870
PCT Pub. Date: Jun. 30, 2016

(65) Prior Publication Data
US 2017/0347132 A1 Nov. 30, 2017

(30) Foreign Application Priority Data

Dec. 23, 2014 (FR) ..................................... 14 63190

(51) Int. Cl.
*H04N 21/2343* (2011.01)
*H04N 21/2362* (2011.01)
*H04N 21/2365* (2011.01)
*H04N 21/431* (2011.01)
*H04N 21/438* (2011.01)
*H04N 21/482* (2011.01)
*H04N 21/485* (2011.01)

(52) U.S. Cl.
CPC ..... *H04N 21/2343* (2013.01); *H04N 21/2362* (2013.01); *H04N 21/2365* (2013.01); *H04N 21/4312* (2013.01); *H04N 21/4314* (2013.01); *H04N 21/4383* (2013.01); *H04N 21/482* (2013.01); *H04N 21/4858* (2013.01)

(58) Field of Classification Search
CPC ........... H04N 21/2343; H04N 21/2365; H04N 21/4383; H04N 21/482; H04N 21/4858
See application file for complete search history.

(56) References Cited

U.S. PATENT DOCUMENTS

| 6,931,660 | B1 * | 8/2005 | Kalluri | ............... H04N 7/17336 348/E5.006 |
| 2009/0067507 | A1 * | 3/2009 | Baird | ..................... H04N 7/152 375/240.24 |
| 2015/0254807 | A1 * | 9/2015 | Citrin | .................... G06T 3/4038 382/284 |

FOREIGN PATENT DOCUMENTS

FR 2 872 988 A1 1/2006

* cited by examiner

*Primary Examiner* — Chenea Smith
(74) *Attorney, Agent, or Firm* — Drinker Biddle & Reath LLP (57) ABSTRACT

A method for generating a first video stream representative of a mosaic of videos, referred to as a video mosaic, from a set of at least two second video streams each consisting of a video associated with header data and encoded video data representative of images. During the course of the method: the encoded video data of the second video streams are stored during the generation of the first video stream, a header associated with said video mosaic is generated, said header being representative of an assembly of the encoded video data from the second video streams, and comprising: first header data which are legacy header data from each of the videos of the set of second video streams, second header data which are generated separately from the header data of the second video streams. Associated computer program, storage media and terminal.

9 Claims, 6 Drawing Sheets

GENERATION OF A VIDEO MOSAIC

CROSS-REFERENCE TO RELATED APPLICATIONS

This application is the U.S. national phase of the International Patent Application No. PCT/FR2015/053694 filed Dec. 21, 2015, which claims the benefit of French Application No. 14 63190 filed Dec. 23, 2014, the entire content of which is incorporated herein by reference.

BACKGROUND

The invention concerns video mosaics. The invention relates in particular to the generation of a video stream representing a mosaic of videos.

In a known manner, such video mosaics are provided by a video stream which, when decoded, results in the display of a plurality of videos, each occupying a region of the viewable image.

To generate such video streams, it is known for example to retrieve audiovisual signals associated with a set of channels that are to be assembled into a mosaic, to subsample them, and to group them into a single channel. This video is then encoded similarly to a conventional channel.

Another approach is to generate a mosaic from video streams respectively decoded by different video decoding instances and to compose the decoded channels into a mosaic on a browser web page.

There are drawbacks to these approaches.

In the first case, the definition and allocation of the component channels of a mosaic are static and cannot be selected by a user. In addition, mosaics formed in this manner must also be broadcast as channels in their own right, which accordingly decreases the bandwidth for other video streams.

In the second case, the mosaic requires a video decoding instance for each displayed channel. Significant resources are therefore required to process such mosaics, making this type of mosaic unsuitable for devices with low computing power.

SUMMARY

The invention improves the situation.

To this end, the invention concerns a method for generating a first video stream representative of a mosaic of videos, referred to as a video mosaic, from a set of at least two second video streams each composed of a video associated with header data and with encoded video data representative of images.

In particular, during the method:
the encoded video data representative of images of each video in the set of second video streams are preserved during generation of the first video stream,
a header associated with said video mosaic is generated, said header being representative of an assembly of the encoded video data representative of images of each video in the set of second video streams, and comprising:
  first header data which are inherited from the header data of each video in the set of second video streams,
  second header data which are generated independently of the header data of each video in the set of second video streams.

The method of the invention allows generating mosaics in a flexible manner, particularly from a selection of channels made by a user. In addition, it does not require transmission of the video stream as its own channel. Finally, it provides a video stream which requires little computing power for decoding in order to display the mosaic.

According to another aspect of the invention, the generated video mosaic is of higher resolution than the resolution of each video in the set of second video streams.

According to another aspect of the invention, the video mosaic is generated from a tile structure, where the encoded video data representative of images associated with each tile of the video mosaic respectively correspond to the encoded video data representative of images associated with each video in the set of second video streams.

This has the effect of simplifying the generation of the first video stream in a context where the second video streams comply with the MPEG-H HEVC/H.265 standard.

According to another aspect of the invention, the video mosaic is constructed from a structure of slices or slice groups, where the encoded video data representative of images associated with each slice or slide group of the video mosaic respectively correspond to the encoded video data representative of images associated with each video in the set of second video streams.

Here, this has the effect of simplifying the generation of the first video stream in a context where the second video streams comply with the MPEG-4 AVC/H.264 standard.

According to another aspect of the invention, for at least one of the second video streams, said second video stream is obtained from a third video stream representative of a video mosaic, said second video stream being representative of one of the videos of said video mosaic of the third video stream.

The method thus allows the generation of a video mosaic from videos which themselves originate from a video mosaic. As a result, this increases the possible configurations of channels used to form the first video stream.

According to another aspect of the invention, for at least one second video stream obtained from a third video stream, the encoded video data of said second stream are independent in terms of prediction of video data supplying the other videos in the video mosaic for which said third stream is representative.

This facilitates the construction of second video streams from third video streams.

According to another aspect of the invention, the second video streams are obtained from a user selection of at least one television channel corresponding to one or more of the second video streams.

This results in greater flexibility in the configuration of the video content to be made viewable by the mosaic.

According to another aspect of the invention, for each video stream in a set of video streams, notification information representative of whether said video stream is suitable for use as a second video stream is constructed and the notification information is associated with said video stream, the notification information of the video streams in said set is received, and the second video streams are selected from said set of video streams.

This has the effect of facilitating the selection of second video streams used to compose the first video stream.

The invention also relates to a computer program comprising instructions for implementing the method as defined above, when this program is executed by a processor.

The invention further relates to a non-transitory storage medium for a computer-executable program comprising a set of data representing one or more programs, said one or more programs comprising instructions which, when said one or more programs is executed by a computer comprising a processing unit operatively coupled to memory means and to a video stream receiver module, cause the computer to generate a video stream representative of a video mosaic according to the method as defined above.

Furthermore, the invention relates to a terminal comprising means for generating a first video stream representative of a mosaic of videos, referred to as a video mosaic, from a set of second video streams each composed of a video associated with header data and with encoded video data representative of images, wherein the generation means are configured for:

preserving the encoded video data representative of images of each video in the set of second video streams, during generation of the first video stream, generating a header associated with said video mosaic, said header being representative of an assembly of the encoded video data representative of images of each video in the set of second video streams, and comprising:

first header data which are inherited from the header data of each video in the set of second video streams, second header data which are generated independently of the header data of each video in the set of second video streams.

BRIEF DESCRIPTION OF THE DRAWINGS

The invention will be better understood from reading the following detailed description, given only as an example and with reference to the accompanying Figures in which.

DETAILED DESCRIPTION

Figure 1:
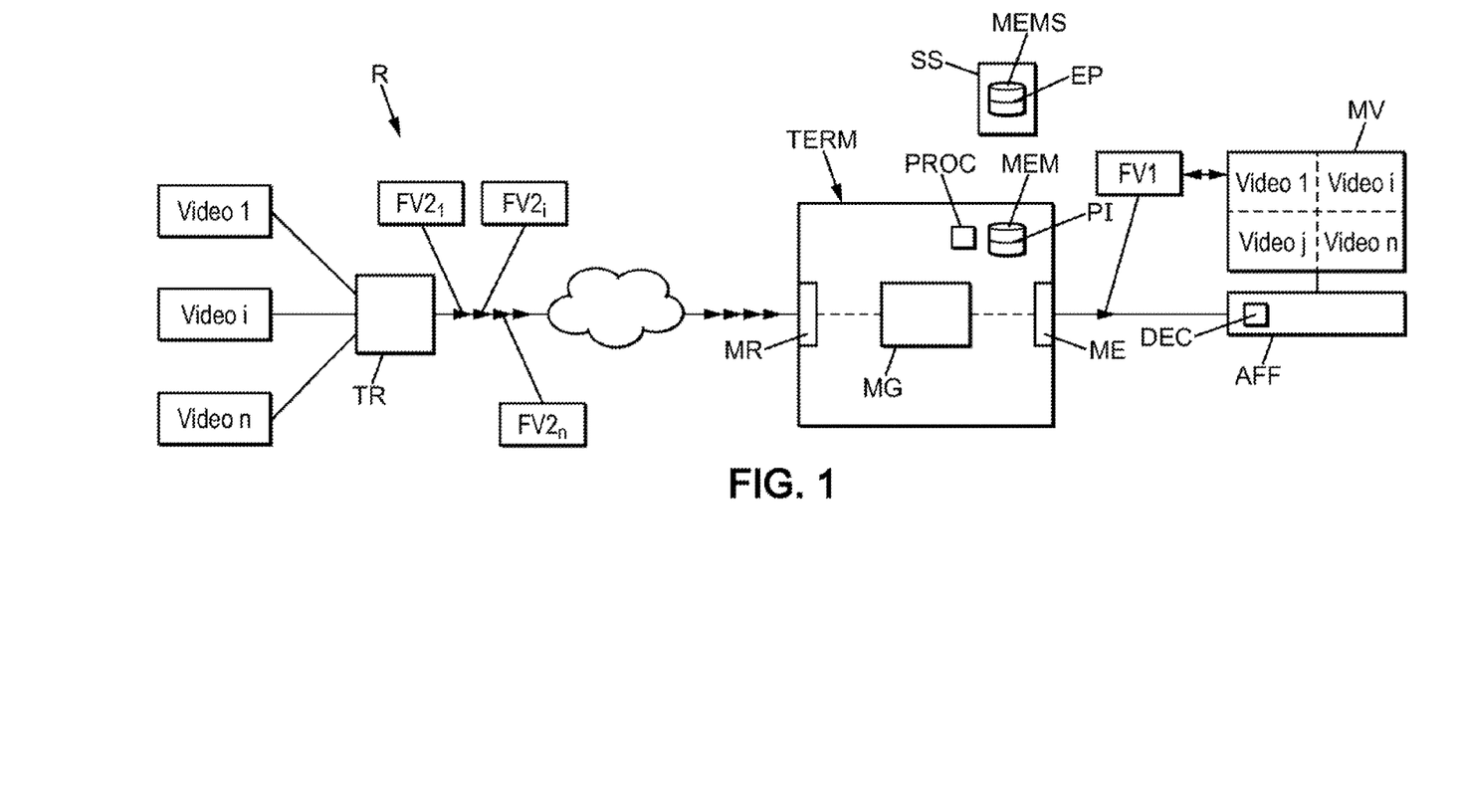
FIG. 1 is a schematic illustration of a storage medium and a terminal according to the invention.

FIG. 1 illustrates a terminal TERM according to the invention.

The terminal TERM is adapted to generate a first video stream FV1 representative of a mosaic of videos MV, hereinafter a video mosaic MV. In a known manner, when it is displayed, such a video mosaic is in the form of a video divided into regions within each of which a given video is viewable. The video is divided for example into two regions or more than two regions.

The various video components of the video mosaic may be identical or different, in other words representing identical or different scenes, the respective images of the various component videos of the mosaic then being respectively identical or different. For example, each pair of videos is different, meaning that the images of one of the regions of the mosaic are different from the accompanying images of the other regions of the mosaic.

More particularly, the first video stream FV1 is generated from second video streams denoted $FV2_1$, . . . , $FV2_i$, . . . , $FV2_n$, and generically designated by the reference FV2. Each video stream FV2 is representative of a video (video 1, video i, video n in FIG. 1).

The first video stream FV1 and the second video streams FV2 each correspond to a set of digital data representative of images forming the corresponding videos. The images of a video stream are organized into sequences of images for example, meaning groups of images that compose the corresponding video.

These video streams comply for example with a set of standards, for example such as the DVB standards ("Digital Video Broadcasting"), MPEG standards ("Moving Picture Expert Group"), etc.

In the context of the invention, the term "video stream" does not mean that the digital data of this stream are only considered in a state where they are circulating between two devices, such as a network connecting a video stream receiver terminal and a server. In the context of the invention, the term "video stream" is understood to mean a set of digital data representative of a video, regardless of whether these data are in circulation between two such devices. In other words, the concept of "video stream" also includes digital data located in a digital storage device such as memory or storage space on a computer server.

Figure 2A:
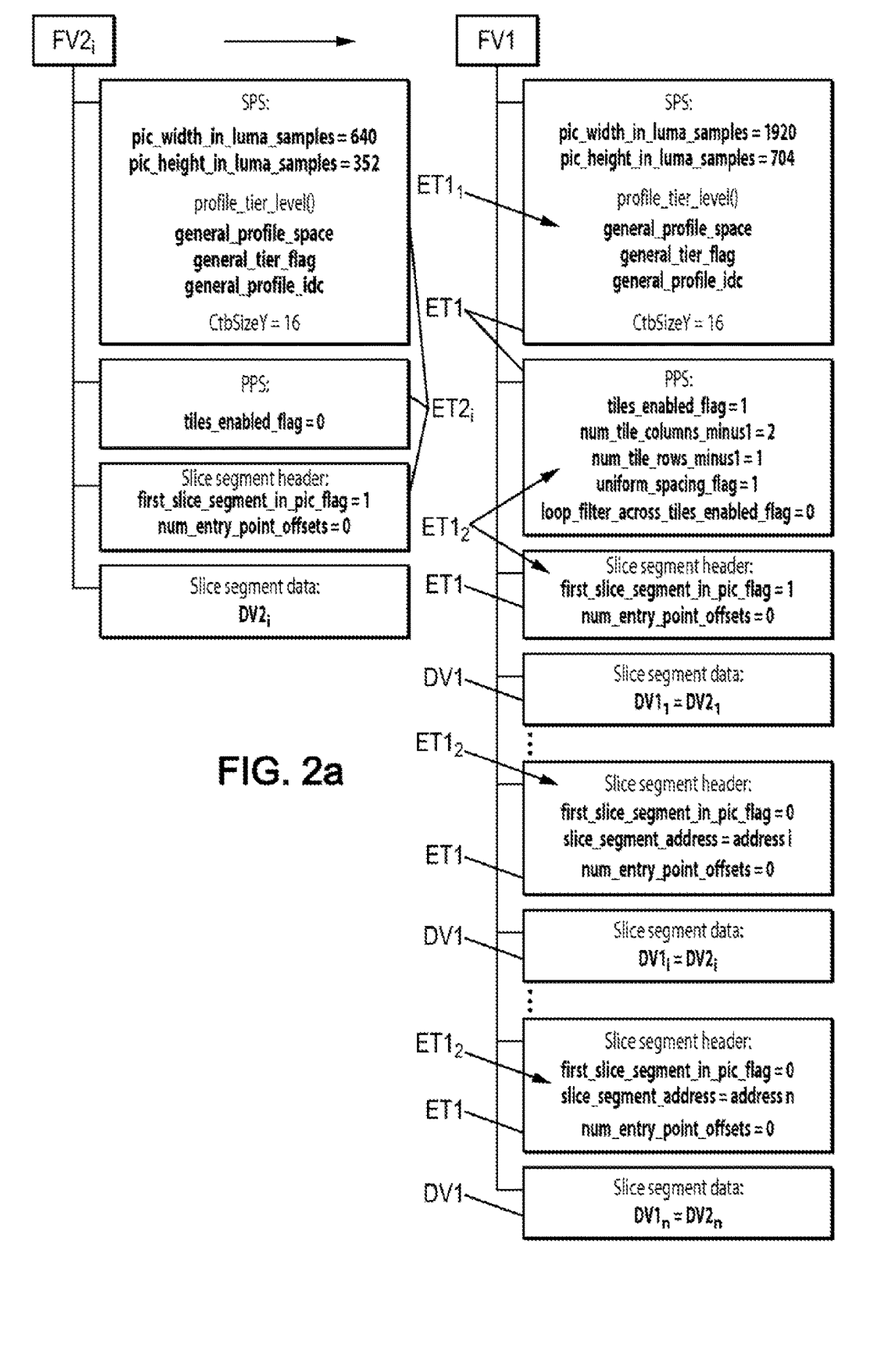
FIGS. 2a and 2b are schematic illustrations of data of a video stream generated within the scope of the invention and of video stream data used to generate the video stream.
Figure 2B:
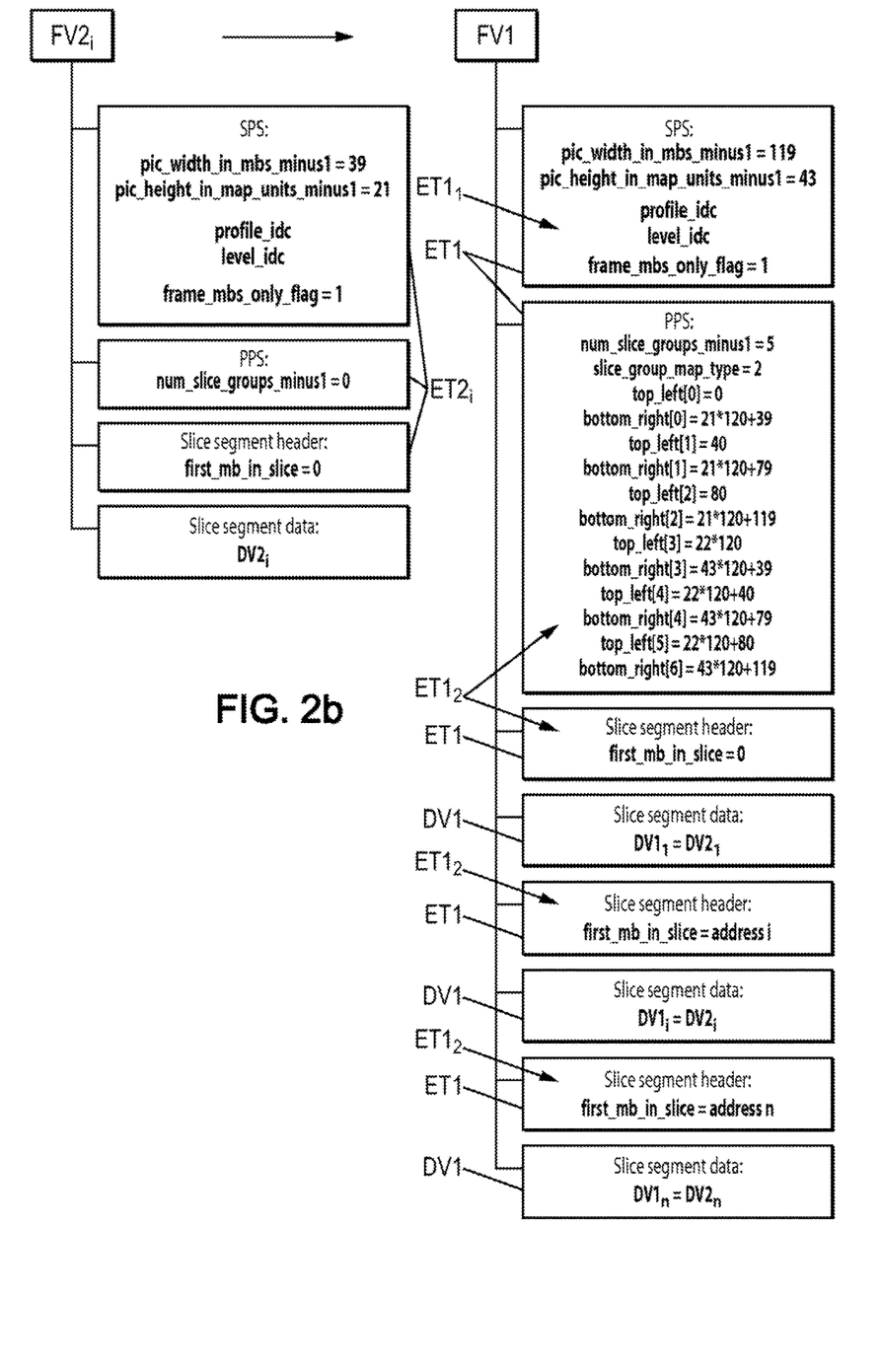

Referring to FIGS. 2a and 2b, the first and second video streams FV1, FV2 comprise header data denoted ET1 for the first stream FV1 and denoted $ET2_i$ for the second video stream $FV2_i$, and encoded video data denoted DV1 for the first video stream and denoted $DV2_i$ for the second video stream $FV2_i$.

The header data are representative of the configuration of the corresponding video. The header data are in particular representative of the coding configuration of the encoded video data of the video stream concerned.

The header data comprise one or more set(s) of parameters and, for each parameter, a value of the associated parameter.

Specifically, the header data of the first and second video streams FV1, FV2 comprise sequence parameters ("Sequence Parameters Set", acronym SPS). These sequence parameters include resolution parameters and profile and level parameters respectively indicating the set of authorized coding tools potentially activated and the stream decoding complexity level. A set of sequence parameters is, for example, associated with each image sequence.

The header data of the first and second video streams FV1, FV2 also include image parameters ("Picture Parameters Set", acronym PPS). These image parameters comprise a parameter activating a structuring of the corresponding image into regions such as slice groups in the MPEG-4 AVC/H.264 standard or tiles in the MPEG-H HEVC/H.265 standard. Such structuring into tiles and slice groups is described below.

Header data of the first and second video streams FV1, FV2 further comprise slice segment parameters ("Slice segment header"), the slices also corresponding to an object used to structure the encoded video data of each image. This structuring into slices is described below.

In the example in FIG. 2a which illustrates the data of the second video streams FV2 in which the video data are encoded in MPEG-H HEVC/H.265 format, the resolution parameters for the second video streams FV2 include the parameters "pic_width_in_luma_samples" and "pic_height_in_luma_samples", and the profile/level parameters include the parameters "general_profile_space", "general_tier_flag" and "general_profile_idc". In addition, the PPS parameters include the parameter activating a structuring of the corresponding image into tiles "tiles_enabled_flag". The slice segment parameters include the parameter "first_slice_segment_in_pic_flag" which indicates whether the corresponding slice segment is the first of the image. Optionally, the slice segment parameters include the parameter "num_entry_point_offsets".

In the example in FIG. 2b, which illustrates the data of the second video streams FV2 in which the video data $DV2_i$ are encoded in MPEG-4 AVC/H.264 format, the resolution parameters for the second video streams FV2 include the parameters "pic_width_in_mbs_minus1" and "pic_height_in_map_units_minus1", and the profile/level parameters include the parameters "profile_idc" and "level_idc". The SPS parameters also include a parameter "frame_mbs_only_flag" that indicates that the video stream contains only macroblocks encoded in progressive mode, and does not contain macroblocks encoded in interlaced mode. This parameter being equal to 1 means that the units used to compose the slice groups are macroblocks, which facilitates the calculation of positioning fields ("top_left" and "bottom_right") of the slice groups. In the case where the encoded content is likely to use interlaced coding tools, the units forming the slice groups are pairs of macroblocks. In addition, the parameter activating a structuring of the corresponding image into slice groups is indicated by the value of the parameter "num_slice_groups_minus1". The slice parameters include the parameter "first_mb_in_slice" which provides the value of the first macroblock of the associated slice.

The header data ET1 of the first video stream FV1 are described in more detail below.

The encoded video data are representative of images of the corresponding video. These data are encoded according to a particular standard, for example the MPEG-4 AVC/H.264 standard, MPEG-H HEVC/H.265 standard, MPEG-2 standard, etc.

Each image of the corresponding video is encoded in the encoded video data in the form of coding units each covering a region of the corresponding image. These coding units are, for example, known as "Macroblocks" in the MPEG-4 AVC/H.264 standard, or as "Coding Tree Units" (CTU) in the MPEG-H HEVC/H.265 standard.

The division of an image into coding units may have a specific structure among a set of possible structures in the relevant standard. In other words, the coding units of an image can themselves be grouped into larger structures, the use of these structures allowing for example refining the configuration of the encoding and/or decoding of the images to improve performance or optimize the video stream for a transport mechanism or protect against specific errors.

For example, the MPEG-H HEVC/H.265 format specifies that the coding units can be grouped into slices of data known as "slices". Each slice corresponds to a region of the image and can have different properties from those of other slices of the same image, for example temporal dependence in prediction compared to other images of the video. These slices may themselves be structured into "Slice Segments". A slice is composed of a first independent slice segment, followed by a set of dependent slice segments. One slice header is present per slice (provided by the header of the independent slice segment), used as a reference by all segments of the slice. Slice segment headers are also present, very small in size relative to the slice header. Each slice segment is encapsulated in a separate transport unit (known as a "NAL Unit", for "Network Abstraction Layer Unit") which allows adapting the size of the transport units to the transport mechanism chosen.

This granularity allows controlling the size of the transport units, reducing the cost of the headers since the slice header information is only provided once.

The MPEG-H HEVC/H.265 format also specifies that the coding units can be grouped into "tiles", each forming a rectangular region of the image. The tiles of an image form rectangular regions that are spatially and/or temporally independent of each other in terms of coding.

Slices contain an integer number of coding units CTU arranged consecutively in the scan order of the image, and do not allow flexibly defining rectangular areas in the image except in the case where the boundaries of the slice match the edges of the image (the defined rectangles then necessarily being the width of the image).

In addition, as mentioned above, the MPEG-4 AVC/H.264 format specifies dividing the images into "slice groups".

The slice groups correspond to partitioning the image into different groups, each group able to contain one or more slices. Different types of partitioning are defined, enabling for example partitioning the image in a checkerboard form, or defining several rectangular areas in the image.

In the context of the invention, preferably the second video streams FV2 used to generate the first video stream FV1 have common properties.

In particular, preferably the second video streams FV2 are based on the same standard (MPEG-4 AVC/H.264, MPEG-H HEVC/H.265, etc.).

In addition, preferably the second video streams FV2 are adapted so that the assembly of their images forms a rectangle.

Furthermore, preferably the coding configurations of the various second video streams FV2 are compatible. Advantageously, these coding configurations are identical. These coding configurations include activated coding tools and the coding options employed. The coding configurations include in particular the number of reference images used to encode the video data of the second video streams FV2. In the context of the MPEG-H HEVC/H.265 standard, these coding configurations include for example the use or non-use of known functions associated with the parameters "amp_enabled_flag" and "sample_adaptive_offset_enabled_flag" of the SPS and PPS. In the MPEG-4 AVC/H.264 standard, these coding configurations include for example the functions associated with the parameters "frame_mbs_only_flag" and "direct_8×8_inference_flag".

Similarly, preferably the sequencing and scheduling of the images of the second video streams FV2 are compatible. This corresponds to the order in which images are coded and the prediction type used for each image or each slice composing these images. As is known, among the prediction types there are: prediction type I for Intra, in which the image (or slice) is coded without reference to another image, prediction type P in which the image (or slice) is coded with reference to a previously coded image, and type B in which the image (or slice) is coded with reference to both a previously coded image and a future image. In addition, preferably said images, referred to as IDR for "Instantaneous Decoding Refresh", are preferentially aligned temporally between the second video streams FV2. In a known manner, these IDR images indicate the start of a sequence in which images are only dependent (when dependent) on images belonging to the sequence in question. This alignment is configured when encoding videos 1 to i to form the second video streams FV2.

Referring to FIG. 1, the terminal TERM comprises a receiver module MR adapted to connect the terminal TERM to a network R over which the second video streams FV2 are transmitted to the terminal. As stated earlier, each second video stream FV2 is representative of a video. Its header data and its encoded video data are constructed in a known manner from the corresponding video. This construction is implemented by a device of the network R, such as for example a network headend TR.

The terminal TERM further comprises a generation module MG configured for generating the first video stream FV1, and a transmission module ME adapted to output the first video stream FV1. In addition, the terminal TERM comprises a processor PROC and a memory MEM for storing computer programs to operate the terminal TERM when executed by the processor PROC. The memory MEM comprises in particular a computer program PI containing instructions whose execution by the processor PROC results in the generation of the first video stream by the generation module MG as described below.

FIG. 1 further illustrates a storage medium SS comprising a storage memory MEMS containing a set of programs PE containing instructions which, when the programs are executed by a computer comprising a processing unit operatively coupled to memory means and a video stream receiver module, cause the computer to generate the first video stream by the method described below. The set of programs corresponds for example to the computer program PI or to a program whose execution by a processor such as the processor PROC installs the program PI in a digital data storage such as the memory MEM.

Figure 3:
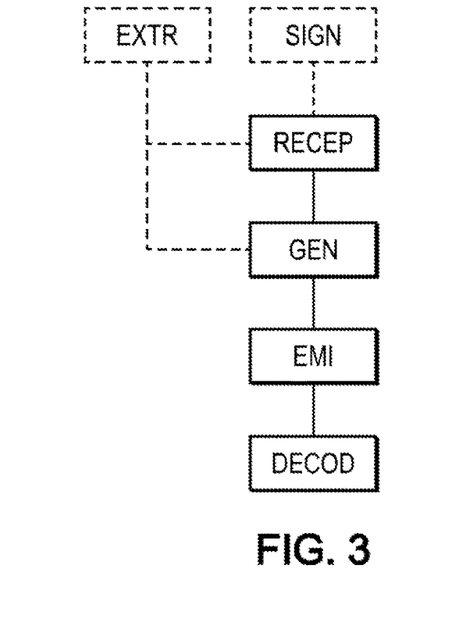
FIG. 3 is a schematic illustration of an example method according to the invention, able to represent the general algorithm of a computer program of the invention.

FIG. 3 is a diagram illustrating the method according to the invention for generating the first video stream FV1. As described above, this generation is done from second video streams FV2.

During a step RECEP, the terminal TERM receives the second video streams FV2 at its receiver module MR. The receiver module is connected to the network R over which the second video streams FV2 are routed. This step takes place for example continuously, the data of the second video streams FV2 arriving continuously at the receiver module MR.

During a generation step GEN, the first video stream FV1 is generated by the generation module MG from second video streams FV2.

During this step, the second video streams FV2 are analyzed. This analysis provides the header data $ET2_i$ and the encoded video data $DV2_i$ of each of the second video streams. This analysis is conducted by any known means, for example by one or more parsers.

The generation module MG then generates the header data ET1 of the first video stream FV1 from the header data $ET2_i$ of the second video streams FV2, and generates the encoded video data DV1 of the first video stream FV1 from the encoded video data $DV2_i$ of the second video streams FV2.

The generated header data ET1 are representative of the assembly, in the images of the first video stream FV1, of images of the second video streams FV2. The header data ET1 comprise first header data $ET1_1$ and second header data $ET1_2$.

The first header data $ET1_1$ are generated by the generation module MG such that these first header data ET1 are inherited from the header data $ET2_i$ of each of the second video streams FV2.

In other words, the parameters of the first header data $ET1_1$ generated by the generation module MG correspond to the parameters present in the header data $ET2_i$ of the second video streams, and are generated precisely because they are present in the header data $ET2_i$.

The first header data $ET1_1$ include the sequence parameters SPS related to the resolution of the images of the first video stream FV1, the profile and the level of the relevant sequence. In the example in FIG. 2a (MPEG-H HEVC/H.265), the sequence parameters SPS included in the first header data may further include one or more of the following parameters: "amp_enabled_flag", "pcm_enabled_flag", "scaling_list_enabled_flag", "sample_adaptive_offset_enabled_flag", "sps_temporal_mvp_enabled_flag", and "strong_intra_smoothing_enabled_flag".

The first header data $ET1_1$ include image parameters (PPS) associated with the coding configuration of images of the first video stream, except for parameters relating to the structuring of images into tiles (MPEG-H HEVC/H.265) and slice groups (MPEG-4 AVC/H.264). In the example of FIG. 2a (MPEG-H HEVC/H.265), the image parameters PPS of the first header data further comprise one or more of the following parameters: "sign_data_hiding_enabled_flag", "weighted_pred_flag", "cabac_init_present_flag", "pps_slice_chroma_qp_offsets_present_flag", "weighted_bipred_flag", "transquant_bypass_enabled_flag".

In the example in FIG. 2b (MPEG-4 AVC/H.264), the sequence parameters SPS included in the first header data include the resolution parameters and the level and profile parameters. They may further include one or more of the following parameters: "frame_mbs_only_flag", "direct_8×8_inference_flag", "gaps_inframe_num_value_allowed_flag". In addition, the image parameters PPS of the first header data may include one or more of the following parameters: "entropy_coding_mode_flag", "weighted_red_flag", "constrained_intra_pred_flag".

Advantageously, the parameters of the first header data $ET1_1$ have respective values that are equal to the values of these parameters in the header data $ET2_i$ of the second video streams FV2, with the exception of the resolution parameters.

In particular, the value of the resolution parameters of the first video stream FV1 is greater than the value of the parameters of the second video streams FV2. In other words, the resolution of the images of the first video stream FV1 is higher than the resolution of the images of the second video streams FV2. The video mosaic MV thus has a higher resolution than the resolution of the videos represented by the second video streams FV2.

In the example in FIG. 2a, the resolution parameters of the second video streams FV2 have the respective values of 640 pixels (width) and 352 pixels (height), these values respectively being 1920 and 704 for the first video stream FV1. In the example of FIG. 2b, these parameters have the values of 39 and 21 for the second video streams FV2, and 119 and 43 for the first video stream FV1 (expressed in macroblocks).

The first video stream FV1 contains configuration information for the reference lists, corresponding in a known manner to a characterization of the images used as reference for predictive coding of the encoded video data of the first video stream FV1. This configuration information for the reference lists is generated from the corresponding information included in the second video streams FV2. Also, advantageously, this configuration information for the reference lists for the first video streams FV1 is identical to the configuration information for the second video stream FV2. This configuration information for the reference lists is distributed for example between the sequence parameters SPS and the image parameters PPS.

Within the context of the MPEG-H HEVC/H.265 standard, this configuration information includes for example the following parameters:
"num_short_term_ref_pic_sets"
"long_term_ref_pics_present_flag",
"num_ref_idx_10_default_active_minus1", and
"num_ref_idx_11_default_active_minus1".

Within the context of the MPEG-4 AVC/H.264 standard, this configuration information includes for example the following parameters:
"max_num_ref_frames",
"num_ref_idx_10_default_active_minus1", and
"num_ref_idx_11_default_active_minus1".

The second header data $ET1_2$ include parameters generated independently of the parameters present in header data $ET2_i$. In other words, the parameters of the second header data $ET1_2$ are generated by the generation module MG regardless of the parameters of header data $ET2_i$ and regardless of the corresponding values.

These parameters of the second header data $ET1_2$ include, in particular, parameters and corresponding values configured to define a structure in a plurality of regions, for each image of the encoded video data DV1 of the first video stream FV1.

Preferably, for encoded video data $DV2_i$ of the second video streams FV2 complying with the MPEG-H HEVC/H.265 format, the parameters of the second header data $ET1_2$ include a parameter declaring a tile structure of each image of the first video stream FV1, and parameters specifying the configuration of the tile structure of each image. In the example in FIG. 2a, the second header data $ET1_2$ thus include the tile structure declaration parameter "tiles_enabled_flag" which has the value of 1, and the parameters "num_tiles_columns_minus1", "num_tiles_rows_minus1", and "uniform_spacing_flag" respectively associated with the number of tile columns in the corresponding image, the number of tile rows in the image, and information for uniformly dividing the image (in other words associated with the fact that the rows are of the same height and the columns of the same width). The values of these three parameters are for example equal to 2, 1, and 1, which defines a subdivision of the corresponding image (or image sequence) of the first video stream FV1 into 6 tiles organized into three columns and two rows. Given the fact that the encoded videos forming the first video stream are independent of each other in principle, the various component videos of the mosaic are even more independent, particularly temporally.

Referring to FIG. 2b, the second header data $ET1_2$ include the parameter declaring a slice group structure "num_slice_groups_minus1", having a value of 5, which defines 6 slice groups within the corresponding image. The second header data $ET1_2$ further includes, for each group, two parameters that define the space occupied by the group. These parameters are "top_left[i]" and "bottom_right[i]", where i denotes the corresponding group. The values of these parameters each correspond to the number of a corresponding macroblock. In the example in FIG. 2b, the second header data $ET1_2$ further include a parameter for the type of subdivision into slice groups "slice_group_map_type". In a known manner, this mechanism for subdividing into slice groups (known as "Flexible Macroblock Order", acronym FMO) is one of several possible types. These types are the following:

interleave (parameter value 0),
dispersed (parameter value 1).
a subdivision having several foreground slice groups and one leftover slice group (parameter value 2),
a type called box-out (parameter value 3),
a type called raster scan (parameter value 4),
a type called wipe (parameter value 5), and
an explicit type in which explicit information associated with a slice group is provided for each macroblock (parameter value 6).

Preferably, the value of the parameter "slice_group_map_type" is equal to 2 or 6. The corresponding types allow defining a partitioning of images into multiple adjacent rectangular blocks in an optimal manner.

Once constructed, the header data ET1 of the first video stream FV1 thus define the structure of each image of the first video stream FV1, and in particular define a subdivision of each image of the first video stream into separate regions (tiles in MPEG-H HEVC/H.265 and slice groups in MPEG-4 AVC/H.264) adapted to form an assembly of images of the second video streams FV2.

Note that the images of the second video streams FV2 may also be subdivided into regions via the tile mechanism (MPEG-H HEVC/H.265) or slice groups mechanism (MPEG-4 AVC/H.264). In other words, the header data $ET2_i$ may also include the parameter "tiles_enabled_flag" having a value of 1 and the parameters describing this subdivision configuration, or the parameter "num_slice_groups_minus1" whose value defines a subdivision of the image into regions smaller than the image itself and the parameters describing the corresponding subdivision configuration.

Figure 4:
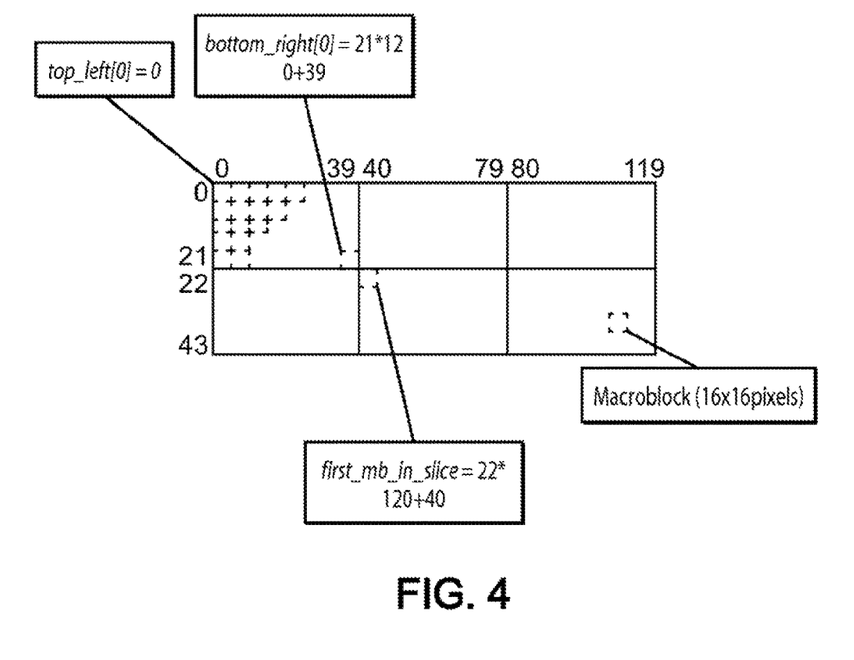
FIG. 4 illustrates a division of an image of a video stream into slice groups.

FIG. 4 illustrates the subdivision obtained by the parameters shown in FIG. 2b. Note that for FIGS. 2a and 2b, the integer n, representing the number of second video streams FV2 from which the first video stream FV1 is obtained, has the value of 6.

The second header data $ET1_2$ further includes, for each region of each image so defined, the slice header data ("slice header segment") associated with the region concerned. These header data serve to locate each region within the image concerned.

In the example in FIG. 2a, the slice header data include a declaration that the region is the first region of the image (parameter "first_slice_segment_in_pic_flag"), this parameter being 1 for the first region of the image and 0 otherwise. For the other regions, the corresponding header data include a "slice_segment_address" parameter indicating the address of the associated region in the image. The value of this parameter is generically denoted as addressi for region i of the image in question. For example, this address corresponds to a spatial offset relative to an origin of the image. For example, in the example of FIG. 2a, the units CTU are configured to have a size of 16×16 pixels (via the parameter CtbSizeY whose value is 16). In this configuration, the second region of the image has the value of 880 for the parameter "slice_segment_address", the third has the value of 1760 for this parameter, etc. In the example of FIG. 2b, the slice header data include a parameter "first_mb_in_slice" which identifies the first macroblock of the corresponding slice group. In this example where the slice group map units ("slice_group_map_unit") are macroblocks (because the value of "frame_mbs_only_flag" is "1"), the value of this parameter is equal to the value of the parameter "topleft[i]" of the corresponding region.

During step GEN, the encoded video data DV1 are constructed by the generation module MG from encoded video data $DV2_i$ of the second video streams FV2. The encoded video data DV1 include, for each image, video data associated with each region defined by the header data ET1. These video data associated with a given region i of an image are denoted $DV1_i$.

During step GEN, for each region of each image of the first stream FV1, the generation module MG maps the video data $DV1_i$ of that region to the encoded video data $DV2_i$ of one of the second video streams FV2.

Specifically, as shown in FIGS. 2a and 2b, for each region of each image of the first video stream FV1, the encoded video data $DV1_i$ constructed for a region are identical to the video data of an image of a second video stream FV2.

During this construction of video data of the first video stream FV1, the encoded video data $DV2_i$ remain encrypted and are not decoded at any time. In other words, they are allocated to regions of images of the first video stream without being decoded. They are preserved and do not undergo modification.

After this step, the first video stream FV1 is constructed. It is then representative of a mosaic of videos of the second video streams FV2, in other words each image of the video stream FV1 is representative of images of the second video streams FV2 in which the images each correspond to a region of an image of the first video stream FV1.

After this step GEN, during a step EMI, the first video stream FV1 is supplied by the transmission module ME of the terminal TERM.

The first video stream FV1 is, for example, supplied to a decoding and display device AFF as represented in FIG. 1.

During a step DECOD shown in FIG. 3, the first video stream FV1 is decoded. This decoding is done for example by a decoding module DEC of device AFF. Once the first video stream FV1 is decoded, the video mosaic MV is rendered by the display device AFF. The video mosaic from the first video stream FV1 is then presented in the form of a video divided into regions of the display device AFF, the video images corresponding to each of the second video streams FV2 being viewable in one of these regions.

Preferably, during step GEN, the second video streams FV2 used to construct the first video stream FV1 result from a user selection of at least one television channel corresponding to one or more second video streams FV2. This selection is made for example via a human-machine interface configured for selecting a television channel displayed on device AFF.

Figure 5:
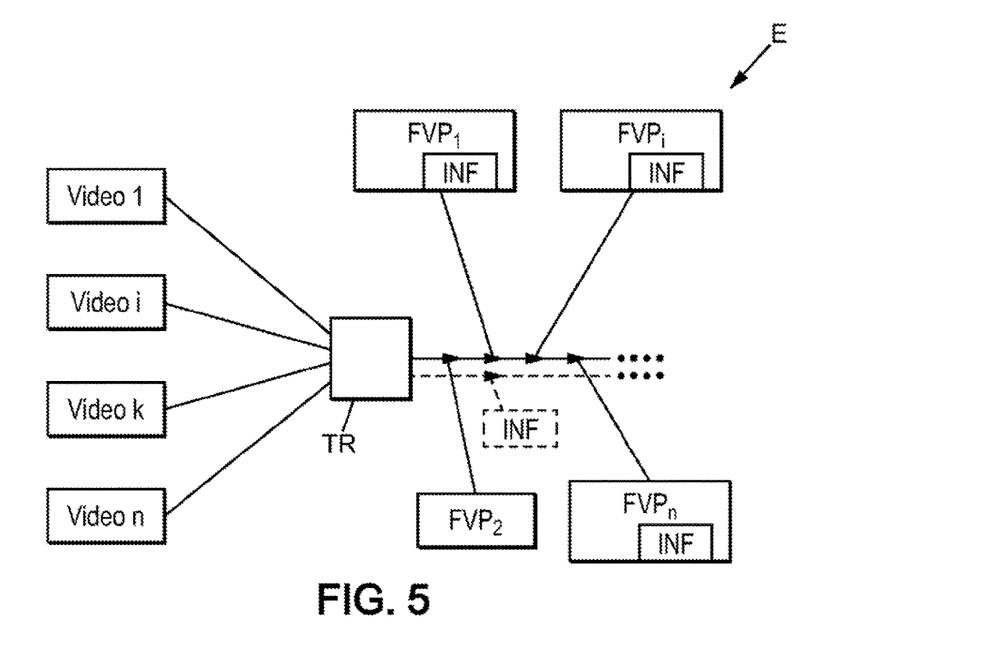
FIG. 5 is a schematic illustration of a set of video streams used in a variant of the method of FIG. 3.

Furthermore, referring to FIG. 5, advantageously the video streams used as second video streams FV2 to construct the first video stream FV1 each include notification information INF representative of the fact that the corresponding video stream is suitable for use as a second video stream FV2.

More specifically, this notification information INF is representative of the fact that the indicated video streams share identical or compatible parameterization. This includes in particular:
  activated coding tools, specified in the header data (SPS, PPS in the case of MPEG-4 AVC/H.264 or MPEG-H HEVC/H.265)
  sequencing of different image types (I, P, B), with full or partial temporal alignment of images called "random access points" which enable the decoding to begin. This includes in particular the IDR images (for "Instantaneous Decoding Refresh") described in MPEG-4 AVC/H.264 or MPEG-H HEVC/H.265,
  number and order of the reference images used for temporal prediction,
  coding resolution.

"Compatible parameterization", for example for a first and second parameterization respectively associated with one of two video streams, is understood to mean that a third parameterization determined from the first and second parameterizations can be created, in which the data of the two video streams can be effectively manipulated without generating errors. In other words, neither of the first and second parameterizations includes a parameter having a value which makes it impossible to manipulate the corresponding data effectively in a third parameterization provided for processing the data of the two video streams due to a conflict with a parameter value of the other parameterization.

Also, in the context of this variant, during a step SIGN preceding step RECEP, a set E of video streams is constructed, each having associated notification information INF. In practice, this association is implemented as the addition of notification information INF to the corresponding video stream. Alternatively, this association is established by a declaration, for example in a file independent of the video streams, that the video streams are usable as second video streams. This alternative is illustrated in FIG. 5 by a block INF (dashed lines) representing the transmission of notification information INF independently of the video streams concerned. In addition, these video streams so indicated are denoted $FVP_1$, $FVP_i$, $FVP_n$ in FIG. 5. Furthermore, the providing of this information is represented by a frame in the associated video stream and in which INF appears.

In the context of this variant, during the generation step GEN and prior to generation of the video stream FV1, the second video streams FV2 are selected from the set E of video streams $FVP_1$, $FVP_i$, $FVP_n$ which have associated notification information INF.

Figure 6:
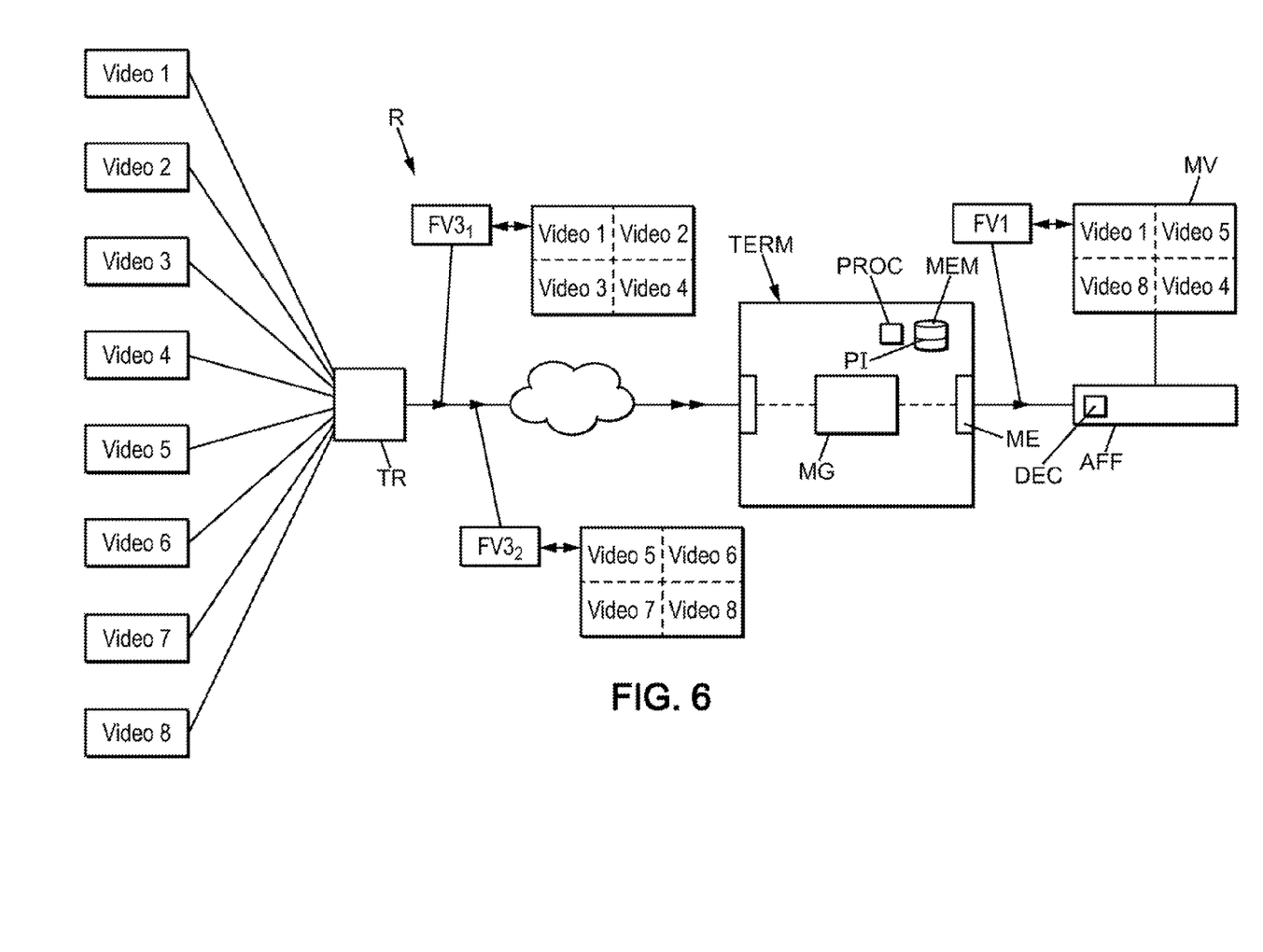
FIG. 6 is a schematic illustration of a video stream generated according to the invention in a variant of the method of FIG. 3.

Referring to FIG. 6, alternatively at least one of the second video streams FV2 is obtained from a third video stream FV3 itself representative of a video mosaic. The other second video streams FV2 are obtained as described above, or are also obtained from a video stream representative of a video mosaic. FIG. 6 illustrates an embodiment in which the second video streams FV2 are all obtained from two third video streams $FV3_1$ and $FV3_2$.

Preferably, in this variant, the third video stream or streams FV3 comply with the MPEG-H HEVC/H.265 standard and present data based on a tile structure for each image, this structure being described above.

This facilitates construction of second video streams FV2 from third video streams FV3.

Furthermore, preferably the encoded video data of the video stream extracted from the third video stream FV3 in order to form a second video stream FV2 are independent in terms of prediction of other videos forming the third video stream FV3 in question. This independence is declared for example by means of a SEI message. These SEI messages correspond to a NAL entity known by the name SEI (for "Supplemental Enhancement Information"). In this case, the message used to declare this independence is known as a "temporal motion-constrained tilesets SEI message".

This further facilitates obtaining the second video stream FV2 from the third video stream FV3.

In the context of this embodiment, during a step EXTR of the method as represented in FIG. 3, each second video stream FV2 to be constructed from a third video stream FV3 is actually constructed. To do so, the corresponding encoded video data are extracted from the third video stream FV3 which then form the encoded video data $DV2_i$, and the header data ET2$_i$ is generated from the header data of the corresponding third video stream FV3.

This step EXTR occurs for example between the receiving step RECEP and the generation step GEN. Alternatively, this step occurs prior to the receiving step RECEP. In such case, the construction of the second video streams FV2 is carried out by a device other than the terminal TERM, for example a headend. This variant reduces the amount of data traveling the network to the terminal TERM.

Advantageously, the third video stream(s) FV3 used to obtain the second video streams FV2 is itself obtained by the method of the invention described above.

Other embodiments are conceivable.

In particular, in the above description, the generation of the first video stream FV1 has been described as implemented by the terminal TERM that receives the video streams. However, this method may be implemented by any device of the network R, the first video stream FV1 as such then being routed through the network R to the terminal TERM. For example, the method is implemented one of the devices of the group formed by: a content server, a service platform, a headend, a residential gateway.

The invention claimed is:

1. A method for generating a first video stream representative of a mosaic of videos, referred to as a video mosaic, from a set of at least two second video streams each composed of a video associated with header data and with encoded video data representative of images, wherein:
   the encoded video data representative of images of each video in the set of second video streams are preserved during generation of the first video stream,
   a header associated with said video mosaic is generated, said header being representative of an assembly of the encoded video data representative of images of each video in the set of second video streams, and comprising:
      first header data which are inherited from the header data of each video in the set of second video streams,
      second header data which are generated independently of the header data of each video in the set of second video streams,
   and wherein the video mosaic is generated from a tile structure, where the encoded video data representative of images associated with each tile of the video mosaic respectively correspond to the encoded video data representative of images associated with each video in the set of second video streams.

2. The method according to claim 1, wherein the generated video mosaic is of a higher resolution than the resolution of each video in the set of second video streams.

3. The method according to claim 1, wherein, for at least one of the second video streams, said second video stream is obtained from a third video stream representative of a video mosaic, said second video stream being representative of one of the videos of said video mosaic of the third video stream.

4. The method according to claim 3, wherein, for at least one second video stream obtained from a third video stream, the encoded video data of said second stream are independent in terms of prediction of encoded video data supplying the other videos in the video mosaic for which said third video stream is representative.

5. The method according to claim 1, wherein the second video streams are obtained from a user selection of at least one television channel corresponding to one or more second video streams.

6. The method according to claim 1, wherein, for each video stream in a set of video streams, notification information representative of whether said video stream is suitable for use as a second video stream is constructed and the notification information is associated with said video stream, and wherein the notification information of the video streams in said set is received and the second video streams are selected from said set of video streams.

7. A non-transitory computer program product comprising instructions for implementing the method according to claim 1 when this program is executed by a processor.

8. A non-transitory storage medium for a computer-executable program comprising a set of data representing one or more programs, said one or more programs comprising instructions which, when said one or more programs is executed by a computer comprising a processing unit operatively coupled to memory means and to a video stream receiver module, cause the computer to generate a first video stream representative of a video mosaic according to the method of claim 1.

9. A terminal comprising means for generating a first video stream representative of a mosaic of videos, referred to as a video mosaic, from a set of second video streams each composed of a video associated with header data and with encoded video data representative of images, wherein the generation means are configured for:
   preserving the encoded video data representative of images of each video in the set of second video streams, during generation of the first video stream,
   generating a header associated with said video mosaic, said header being representative of an assembly of the encoded video data representative of images of each video in the set of second video streams, and comprising:
      first header data which are inherited from the header data of each video in the set of second video streams,
      second header data which are generated independently of the header data of each video in the set of second video streams,
   the video mosaic being generated from a tile structure, where the encoded video data representative of images associated with each tile of the video mosaic respectively correspond to the encoded video data representative of images associated with each video in the set of second video streams.

* * * * *